US008660560B2

(12) United States Patent
Oostveen et al.

(10) Patent No.: US 8,660,560 B2
(45) Date of Patent: Feb. 25, 2014

(54) SYSTEM FOR UPDATING A NEIGHBOUR CELL LIST (NCL) OF A WIRELESS ACCESS NODE OF A TELECOMMUNICATIONS ARCHITECTURE AND METHOD THEREFORE

(75) Inventors: Job Cornelis Oostveen, Haren (NL); Ljupco Jorguseski, Rijswijk (NL); Remco Litjens, Voorshoten (NL); Adrian Victor Pais, Rijswijk (NL); Haibin Zhang, The Hague (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/499,924

(22) PCT Filed: Oct. 5, 2010

(86) PCT No.: PCT/EP2010/064823
§ 371 (c)(1),
(2), (4) Date: Apr. 3, 2012

(87) PCT Pub. No.: WO2011/042433
PCT Pub. Date: Apr. 14, 2011

(65) Prior Publication Data
US 2012/0225658 A1     Sep. 6, 2012

(30) Foreign Application Priority Data
Oct. 7, 2009   (EP) .................................... 09172399

(51) Int. Cl.
*H04W 36/08*      (2009.01)
(52) U.S. Cl.
USPC ......................................... 455/437; 370/331

(58) Field of Classification Search
USPC ............................. 455/435.1–445, 524–525; 370/329–334, 336, 350
See application file for complete search history.

(56) References Cited

U.S. PATENT DOCUMENTS

| 7,539,175 | B2 * | 5/2009 | White et al. ................... 370/350 |
| 2006/0193295 | A1 * | 8/2006 | White et al. ................... 370/336 |
| 2009/0137265 | A1 * | 5/2009 | Flore et al. ..................... 455/525 |
| 2011/0013587 | A1 * | 1/2011 | Serravalle ...................... 370/331 |

FOREIGN PATENT DOCUMENTS

| WO | 2009019319 | 2/2009 |
| WO | 2009045070 | 4/2009 |

(Continued)

OTHER PUBLICATIONS

LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8); Jul. 2009.*

(Continued)

*Primary Examiner* — Kashif Siddiqui

(57) ABSTRACT

The invention relates to a system and method for updating a neighbour cell list of a wireless access node. User terminals to be to be transferred from a first wireless access node of a first wireless access network to a second wireless access node of a second wireless access network are detected. From the first wireless access node, one or more of the detected user terminals are requested to report cell information of a plurality of wireless access nodes of at least one of the first wireless access network and the second wireless access network. The cell information is received from the one or more of the detected user terminals and at least one of the first neighbour cell list and the second neighbour cell list is updated using the received cell information.

17 Claims, 4 Drawing Sheets

(56) References Cited

FOREIGN PATENT DOCUMENTS

| | | |
|---|---|---|
| WO | 2009064716 | 5/2009 |
| WO | 2009119699 | 10/2009 |

OTHER PUBLICATIONS

International Search Report, mailed Jan. 24, 2011 in connection with International Patent Application No. PCT/EP2010/064823.

* cited by examiner

SYSTEM FOR UPDATING A NEIGHBOUR CELL LIST (NCL) OF A WIRELESS ACCESS NODE OF A TELECOMMUNICATIONS ARCHITECTURE AND METHOD THEREFORE

PRIORITY CLAIM TO RELATED APPLICATIONS

This application is a national stage application under 35 U.S.C. §371 of PCT/EP2010/064823, filed Oct. 5, 2010, published as WO 2011/042433 A1 on Apr. 14, 2011, and claiming priority to European Application No. 09172399.9, filed Oct. 7, 2009, which application and publication is incorporated herein by reference and made a part hereof in its entirety, and the benefit of priority of which is claimed herein.

FIELD OF THE INVENTION

The invention relates to the field of telecommunications systems and a method in telecommunications architecture. More specifically, the invention relates to a telecommunications architecture comprising at least a first and a second wireless access network between which user terminals can be transferred and a method in such a telecommunications system, wherein the neighbour cell lists (NCLs) of at least a wireless access node of the first and/or second wireless access network can be updated using a system.

BACKGROUND OF THE INVENTION

When moving through the coverage area of a wireless access cellular network, mobile user terminals continuously scan the spectrum for pilot or reference signals (beacons) in order to determine which cell (base station) to camp on. In idle mode, this is referred to as cell reselection, while in active/dedicated mode, this is referred to as handover. The cell-specific list of surrounding cells that are considered for cell reselection or handover is called the neighbour cell list (NCL), which is stored in each base station and broadcast within the cell. The mobile user terminal receives and stores the NCL. The NCL contains the cells for which the mobile user terminal should send measurement reports (when certain criteria are met) to the base station currently serving the user terminal.

In case of multiple, cooperating wireless access cellular networks, each cell not only has an intra-network NCL, but also an inter-network NCL.

The optimisation of the NCLs is traditionally done with the aid of off-line planning tools, using path loss predictions and (off-line) optimisation algorithms. Currently, automated configuration and optimisation of intra-network NCLs and inter-network NCLs, based on e.g. actual measurement feedback from user terminals, observed mobility patterns, base station scans and handover statistics, are being investigated.

3GPP TS 36.300, V8.9.0, discloses an automatic neighbour relation (ANR) function to relieve an operator from the burden of manually managing neighbour relations. Such an ANR function resides in the eNode-B (eNB) of an LTE network and manages a conceptual neighbour relation table (NRT). A neighbour detection function is used to find new neighbours and to add them to the NRT, whereas a neighbour removal function removes outdated neighbours from the NRT. The eNB instructs a user terminal from a serving cell to look for neighbour cells of other networks by scanning all cells. The user terminal first reports the physical cell identifier (PCI) of the detected cells in the other network. When the eNB receives the reports from the user terminals containing the PCI's of the cells, the eNB instructs the user terminal, using the newly discovered cell as a parameter, to read the Cell Global Identifier (CGI) and further cell information from the neighbouring cells. The user terminal also reports this information to the serving cell. The eNB may then update the NRT using the information reported from the user terminals.

SUMMARY OF THE INVENTION

A system is disclosed for a telecommunications architecture that comprises a first wireless access network having a first wireless access node for which at least one first neighbour cell list is defined and a second wireless access network having a second wireless access node for which at least one second neighbour cell list is defined.

The system comprises a detector configured for detecting user terminals about to be transferred, i.e. for which cell reselection or handover will be performed, from the first wireless access node of the first wireless access network to the second wireless access node of the second wireless access network.

The system also comprises a request generator configured for requesting from the first wireless access node one or more of the detected user terminals to report cell information of a plurality of wireless access nodes of at least one of the first wireless access network and the second wireless access network. The telecommunications system, particularly at least one of the first and the second wireless access node, also comprises a receiver configured for receiving the cell information from one or more of the detected user terminals. Updating means are provided configured for updating at least one of the first neighbour cell list and the second neighbour cell list using the received cell information.

A method in a telecommunications architecture is also disclosed. User terminals about to be transferred from the first wireless access node of the first wireless access network to the second wireless access node of the second wireless access network are detected. From the first wireless access node, one or more of the detected user terminals are requested to report cell information of a plurality of wireless access nodes of at least one of the first wireless access network and the second wireless access network. The cell information is received from one or more of the detected user terminals and at least one of the first neighbour cell list and the second neighbour cell list is updated using the received cell information.

Furthermore, a mobile user terminal containing at least one neighbour cell list of the first wireless access node is disclosed. The terminal comprises a receiver for receiving the request for reporting cell information of a plurality of wireless access nodes of at least one of the first wireless access network and the second wireless access network. The mobile terminal also contains scanning means configured for detecting the cell information from the wireless access nodes, at least one of the wireless access nodes being absent in the neighbour cell list, and a transmitter for transmitting the detected cell information. At present, standardization does not allow mobile terminals to measure cells not present in the NCL. However, there are no intrinsic obstacles for making performing such measurements. The mobile terminal is arranged for temporarily storing the detected cell information and transmitting the detected cell information to the second wireless access node after being transferred from the first to the second wireless access network.

It is noted that in the present application the terms wireless access node and cell are used as similar terms. The skilled person will appreciate that a single wireless access node may provide multiple cells and that, typically, a neighbour cell list is defined for each of the cells of such a node.

The plurality of wireless access nodes of which cell information is requested may exclude the first wireless access node, or more particularly, the cell thereof currently serving the user terminal. On the other hand, the plurality of wireless access nodes would typically include cells that are absent in the neighbour cell list stored in the user terminal for regularly reporting measurement reports to the serving cell. Otherwise, since the neighbour cell list is obtained from the serving cell, the detection of the cell information by the user terminal would be restricted to this list and would therefore only be suitable for verifying the existing NCL and not for adding new neighbouring cells to the list. In an embodiment, the user terminal performs a complete scan for all cells in the first wireless access network (possibly excluding the currently serving cell) and/or all cells in the second wireless access network to allow the telecommunications system to obtain a complete picture of the available cells around the first wireless access node. This complete information containing the scan of all cells may then be used for updating the NCL(s). Alternatively, the user terminal may compare the received complete information with the NCL it has obtained from the first wireless access node and only report cell information of cells not present on the current NCL.

The first and second wireless access networks may differ in radio access technology (e.g. GSM and UMTS or UMTS and LTE), the deployed release of a given radio access technology, the used frequency spectrum (e.g. the 900 MHz and 1800 MHz frequency bands (the latter also being referred to as a DCS network) for GSM, different 5 MHz carriers for UMTS) and/or wireless access networks of different mobile operators. The wireless access network may also differ in the type of cells provided, e.g. macro cells and pico cells.

The disclosed system and method are able to specifically direct the request for cell information for the first and/or second network to user terminals in the regions where cell reselection or handover from the first to the second wireless access network is about to occur. By collecting this information specifically at cell reselection or handover moments, the updating of the NCL is inherently based on the inter-network neighbours that a user terminal experiences in the cell reselection or handover region, where the reports of the user terminal measurements are most relevant for construing the NCL.

In some instances, user terminals may move rapidly through an area and cell reselection and handover to the second wireless access network should be performed quickly. In such cases, insufficient time may be available for performing the scan for obtaining the cell information for the first wireless access network and for reporting the cell information to the telecommunications system via the first wireless access network. The embodiments of the invention as defined in claims 2 and 10 provide additional time for completing the method by performing the cell reselection or handover as soon as the mobile user terminal has been instructed for performing the scan for cell information for the first and/or the second wireless access network. By temporarily storing the cell information resulting from the scan at the mobile user terminal, the user terminal may carry the cell information to the second network where it has sufficient time to report the cell information of the plurality of wireless access nodes of the first wireless access network via the second network.

The cell information of the wireless access nodes of the first wireless access network may be used for updating the neighbour cell list of the first wireless access node and/or for updating the neighbour cell list of the second wireless access node, or the cells thereof.

The updating of the neighbour cell list of the second wireless access node is relevant for user terminals reselecting cells or handed over from the second wireless access node to the first wireless access network, i.e. in the cell reselection or handover direction reverse to the direction travelled by the terminals reporting the cell information. Since other user terminals will be transferred from the second wireless access network to the first wireless access network, the neighbour cell list of the first wireless access node may also be updated in this way.

The cell information of the plurality of access nodes of the first wireless access network as received via the second wireless access node may also be transferred back to the first wireless access node, e.g. for updating the intra-network neighbour cell list, as defined in claim 3 and, optionally, in claim 10. In a particular example, this embodiment may be used to reduce the so-called 'missing neighbour' effect in a UMTS network, here being the first wireless access network. User terminals equipped to connect to UMTS networks are restricted to gathering cell information as defined in the neighbour cell list received from the base station currently serving the user terminal. An absent cell in the neighbour cell list of the base station will thus never be measured and reported by the user terminal as a result of this restriction of the user terminal. When the signal of a missing neighbour is too strong, call drops may occur. The present embodiments may reduce this problem by instructing the user terminals to also scan for cell information of wireless access nodes of the UMTS network being absent in the neighbour cell list (and thus possibly revealing the existence of cells not present in the neighbour cell list of the base station) and to report this via the second wireless access network back to the first wireless access node. The NCL of the first wireless access node may then be updated with the missing neighbour cell.

The user terminals may also be instructed to obtain the cell information of the plurality of wireless access nodes of the second wireless access network shortly before cell reselection or handover to the second wireless access node of this network and report the cell information to the telecommunications system via this second wireless access node, i.e. after cell re-selection or handover. This embodiment is defined in claims 4 and 11.

Again, the cell information of the wireless access nodes of the second wireless access network may be used for updating the neighbour cell list of the first wireless access node and/or for updating the neighbour cell list of the second wireless access node. The cell information obtained for the access nodes of the second wireless access network may be relevant for the second wireless access network itself, e.g. for updating the intra-network NCL, in view of the 'missing neighbour' effect occurring in particular types of network such as UMTS, as discussed above for the first wireless access network.

The cell information of the plurality of access nodes of the second wireless access network as received via the second wireless access node may be transferred back to the first wireless access node as defined in claim 5 and, optionally, in claim 11. In doing so, the first wireless access node may update its neighbour cell list using the received cell information obtained shortly before cell reselection or handover, even when the user terminals have insufficient time for reporting the cell information for the plurality of wireless access nodes of the second wireless access network directly to the first wireless access node. The updated NCL is relevant for cell reselection or handover from the first wireless access node to the second wireless access network for other user terminals.

Of course, when sufficient time for reporting the cell information of the plurality of wireless access nodes of the second network is available, this cell information obtained shortly before cell reselection or handover to the second wireless access network can be reported directly to the first wireless access node, as defined in the embodiments of claims 6 and 12.

It is not required that all handover or cell reselection instances trigger a scan for cell information by the user terminals. A wireless access node may for instance indicate on its broadcast channel not only whether handovers and/or cell reselections should trigger such reporting, but also a likelihood parameter which the terminal can use to flip a (biased) coin in determining whether it should send cell information at a specific handover or cell reselection instance. Alternatively, the wireless access node may explicitly signal to the specific user terminal whether it should do the cell measurement and reporting. In this manner, the amount of cell information reporting can be tuned, which relates to a trade-off between the measurement overhead (signalling load) and the potential for neighbour cell list optimisation.

One embodiment of tuning the amount of cell list optimisation traffic is to use the location information from the user terminals as a selection criterion as defined in claim 7. The location information may e.g. be obtained from a GPS module in the user terminal or by means of measurements using the first and/or the second wireless access network. This location information can be useful e.g. in identifying where handover regions exist, and in solving location-specific outages or problems, e.g. dropped calls due to 'missing neighbour'. It may also be useful when an operator changes configuration (optimisation of downlink power, antenna tilt, etc) and wants to measure the effect on the cells relevant for inter-RAT cell change or handover.

Another advantageous selection criterion for determining which user terminals should report cell information is the transfer threshold that may have been set by the operator(s) of the telecommunication system, as defined in claim 8. The transfer threshold determines at what level (typically involving pilot signal measurements) cell reselection or handover would occur. The transfer threshold for cell reselection or handover from the first wireless access network to the second wireless access network may be asymmetric (i.e. a different transfer threshold Th2 applies for a transfer from the second to the first wireless access network) and may also be dependent on the service type of the service received by the user terminal when connected to the first wireless access node. As an example, a user terminal provided with a voice service by a cell of an LTE network that is handed over to a GSM network might not be handed over back to the LTE network. This is because the operator chooses this mode of operation. In such a case, although this user terminal is a detected user terminal in the sense that it is about to be transferred to the second wireless access network (GSM), it is not selected for reporting requested to report cell information of the plurality of wireless access nodes of the first wireless access network (the LTE network), since the handover in the direction back to the first network (the LTE network) will generally not be made. On the other hand, for a user terminal using a data service that is temporarily handed over from an LTE network to a GSM network, a handover back to the LTE network is generally preferred and such user terminals can be selected to report cell information of the plurality of wireless access nodes of the second network. The embodiment of the telecommunications system of claim 8 may also be used for the method in the telecommunications system as defined in claims 10-13.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
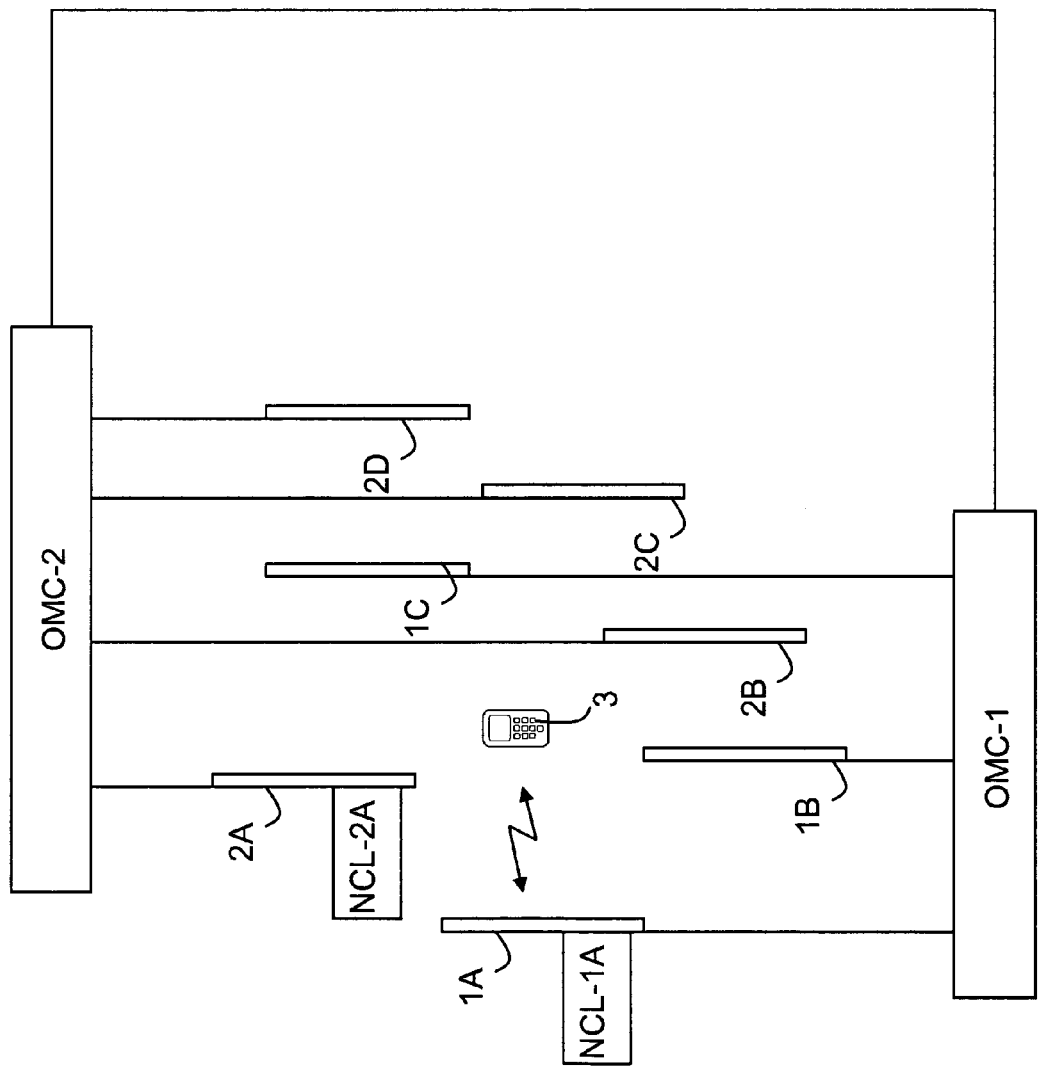
FIG. 1 provides a schematic illustration of a telecommunication system comprising a first and a second wireless access network, each having a plurality of wireless access nodes, according to an embodiment of the invention.

FIG. 1 is a schematic illustration of first wireless access nodes 1A-1C of a first wireless access network and second wireless access nodes 2A-2D of a second wireless network. As an example, the first wireless access nodes 1A-1C are eNBs of an Long Term Evolution (LTE) network, whereas the second wireless access nodes 2A-2D are NodeBs of an UMTS network. Other examples includes wireless access networks differing in other radio access technologies (RATs), e.g. GSM and UMTS, differences in the deployed release of a given radio access technology, differences in the used frequency spectrum (e.g. the 900 MHz and 1800 MHz frequency bands (the latter also being referred to as a DCS network) for GSM, different 5 MHz carriers for UMTS) and/or wireless access networks of different mobile operators. The wireless access network may also differ in the type of cells provided, e.g. macro cells and pico cells.

The wireless access nodes 1A-1C and 2A-2D can be controlled by control systems as schematically illustrated in FIG. 1. As an example, the control system may be Operation and Maintenance Centres (OMCs) as generally known in the art. The OMCs of the wireless access networks can be interconnected. Other connections between the wireless access networks can be used as well. If the wireless access nodes of the first and second wireless access networks originate from the same vendor, a single OMC can be used.

Each of the wireless access nodes 1A-1C and 2A-2D may contain at least one neighbour cell list (NCL). In FIG. 1, NCL-1A and NCL-2A are indicated as NCL of the corresponding wireless access nodes. When a wireless access node provides multiple cells, typically each cell has a corresponding NCL.

A wireless access node broadcasts the NCL and mobile user terminals 3 camping on such a cell receive and store the NCL. The NCL is typically used to instruct the mobile terminal 3 which cells to monitor and to report every now and then the received signal strengths of each of the monitored cells, such that the network can make a decision whether or not the mobile terminal 3 should select or should be handed over to another cell.

As an example, the mobile terminal 3 receives the NCL-1A from wireless access node 1A to which it is currently connected. NCL-1A contains the cell(s) of neighbouring access nodes 1B and 1C and mobile terminal 3 monitors the signal strengths of these cells and reports these to the wireless access node 1A. Such an NCL-1A is referred to as an intra-network NCL. NCL-1A may also list neighbouring access nodes 2A and 2B of the second wireless access network, in which case NCL-1A would be referred to as an inter-network NCL. NCL-1A may also be a combined NCL, i.e. a combination of an intra-network and an inter-network NCL. Currently, automated configuration and optimisation of intra-network NCLs and inter-network NCLs is based on e.g. actual measurement feedback from user terminals 3 as disclosed in 3GPP TS 36.300, V8.9.0.

Figure 2:
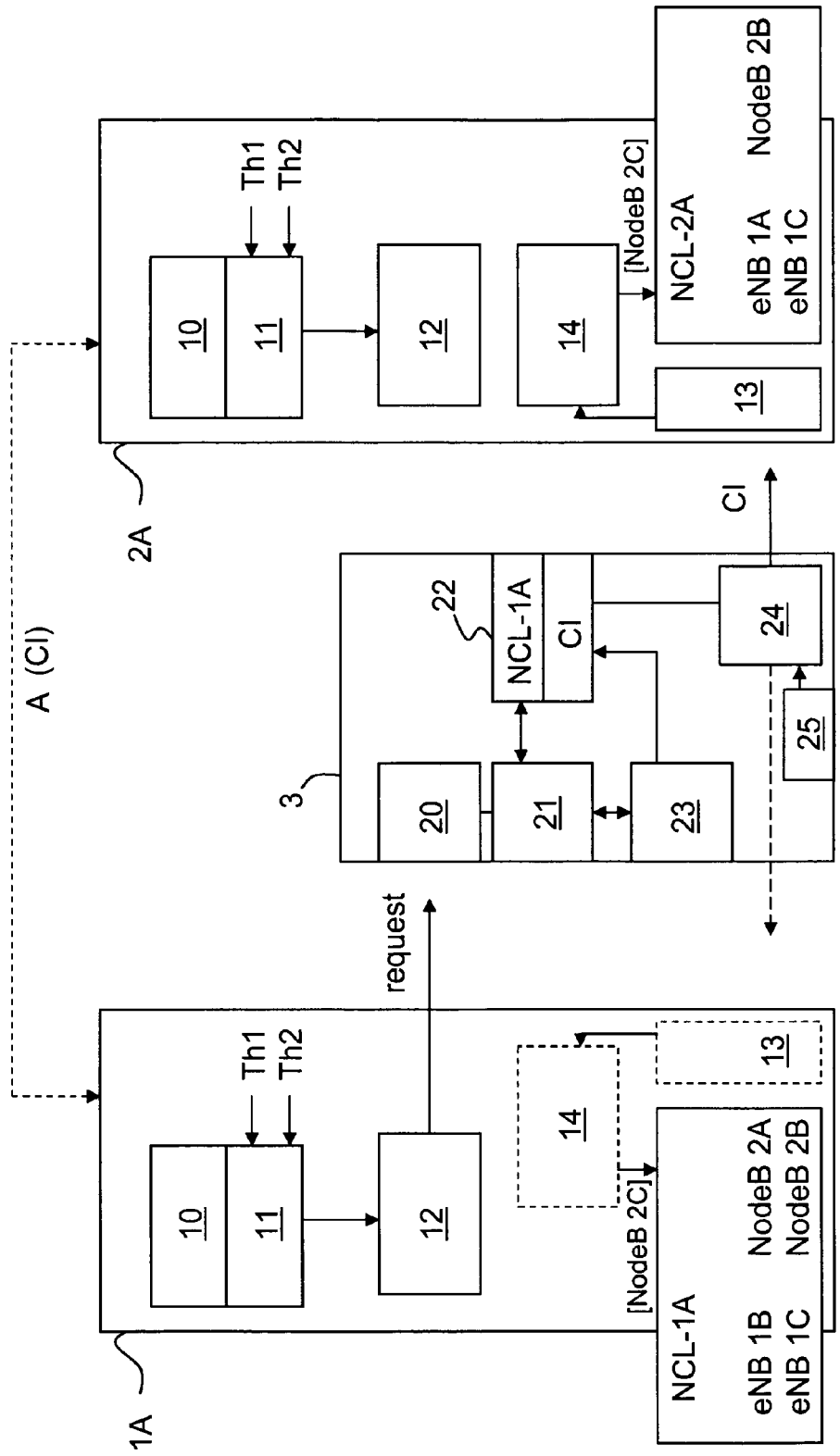
FIG. 2 provides a schematic illustration of a mobile user terminal and wireless access nodes configured for performing a method according to an embodiment of the invention.

Referring also to FIG. 2, an embodiment will now be described in further detail, wherein intra-network NCL-1A contains the cells of eNBs 1B and 1C and inter-network NCL-1A contains the cells of NodeBs 2A and 2B. Note that inter-network NCL-1A does not yet contain NodeBs 2C and 2D.

Mobile user terminal 3 is assumed to camp on a cell of eNB 1A and is monitoring the cells of eNB's 1B, 1C and NodeBs 2A and 2B as indicated in the intra-network and inter-network NCLs transmitted in the cell under consideration. The mobile user terminal 3 regularly sends measurement reports to the eNB 1A as generally known in the art.

As illustrated schematically in FIG. 2, eNB 1A contains a cell reselection/handover detector 10 that recognizes that mobile terminal 3 requires a cell reselection or handover to NodeB 2A of the second wireless access network. The cell reselection or handover indication triggers the following sequence of events in eNB 1A.

First, it may be determined whether or not the mobile terminal 3 for which a cell reselection or handover indication is received should participate, i.e. should be selected, in the process for updating (which includes the verification of the correctness) of an NCL, such as NCL-1A or NCL-2A. To that end, the eNB 1A contains a selection module 11 for selecting a part of the user terminals 3 for which a cell reselection or handover indication is detected. In this manner, it is possible to filter an appropriate portion the user terminals for which cell reselection or handover is about in order to reduce unnecessary signalling over the first and/or second wireless access network. The decision whether or not to participate in the updating process, i.e. whether or not to provide information to the telecommunication system allowing the updating of the NCL's, may either be taken at the mobile terminal or at the telecommunications system, particularly eNB 1A.

As an example, eNB 1A may indicate on its broadcast channel not only whether handovers and/or cell reselections should trigger such reporting, but also a likelihood parameter which the terminal 3 can use to flip a biased coin in determining whether it should send information at a specific handover or cell reselection instance. Alternatively, eNB 1A may explicitly signal to the specific user terminal 3 whether it should do the cell measurement and reporting. In this manner, the amount of cell information reporting can be tuned, which relates to a trade-off between the measurement overhead (signalling load) and the potential for neighbour cell list optimisation.

An advantageous selection criterion at the side of the eNB 1A for determining which user terminals 3 should report cell information is the transfer threshold that may have been set by the operator(s) of the telecommunications system between the first and the second wireless access networks. The transfer threshold determines at what level (typically involving pilot signal measurements) cell reselection or handover would occur. The transfer threshold Th1 for cell reselection or handover from the first wireless access network to the second wireless access network may be asymmetric (i.e. a different transfer threshold Th2 applies for a transfer from the second to the first wireless access network) and may also be dependent on the service type of the service enjoyed by the user terminal when connected to the first wireless access node.

In FIG. 1, the user terminal 3 camping on a cell of eNB 1A of an LTE network using a data service that is about to be handed over to NodeB 2A of an UMTS network will generally be handed over back to the LTE network, if possible, because the operator applies a low threshold for handing over the user terminal 3 from the UMTS network to the LTE network for data services but a much higher threshold for handing over the user terminal to the UMTS network. In such a case, since a transfer between the networks is more likely in one direction than in the other, the terminal 3 may or may not be selected for providing information useful for the NCL updating process as will now be described in further detail.

The selection stage of user terminals 3 may be omitted completely or may be selectively applied, e.g. during particular hours of the day or at particular stages of the configuration and optimisation of the network.

Once user terminal 3 has been selected, request generator 12 in FIG. 2 is activated in order to request the user terminal 3 to report cell information of a plurality of wireless access nodes.

The plurality of wireless access nodes of which cell information is requested may exclude the cell of eNB 1A currently serving the user terminal 3. On the other hand, the plurality of wireless access nodes would typically include cells that are absent in the neighbour cell list NCL-1A stored in the user terminal 3 for regularly reporting measurement reports to the serving cell. In the example of FIG. 1, the cell information requested would typically include cell information of at least one of the cells NodeB 2C or NodeB 2D. In other words, the user terminal 3 should at least monitor other cells than included in the neighbour cell list NCL-1A.

The user terminal 3, to that end, contains a receiver 20 (see FIG. 2) for receiving the request for reporting cell information of a plurality of wireless access nodes. The actual determination for which cells the cell information should be obtained and/or should be reported may be performed in the eNB 1A (and than being signalled to the user terminal 3) and/or internally in the user terminal 3.

When the updating of e.g. NCL-1A would only involve the determination whether additional cells should be included in the list, cell information may only be obtained for the cells of NodeB 2C and NodeB 2D. NCL-1A may be used to determine which cell(s) should be excluded for the gathering of cell information for the purpose of updating the NCL in such a case. However, when NCL-2A should be updated, the cells listed in NCL-1A should not necessarily be excluded.

On the other hand, if the NCL updating is also used to verify the existing NCL, cell information for one or more cells of the existing NCL should be gathered as well. In a particular embodiment, user terminal 3 comprises a determination module 21 for determining for which cells the cell information for the purpose of the NCL update should be gathered. As mentioned, the determination by the determination module 21 may be fully based on instructions received from the wireless access node eNB 1A or may be (partly) based on an internal comparison algorithm of the user terminal 3, using the copy of NCL-1A stored in a section of storage 22. The stored NCL may also be applied (illustrated by the arrow between scanning module 23 and determination module 21) after detecting (a part of) the cell information of all the available cells, as will be explained in further detail below.

The gathering of cell information for the purpose of updating an NCL may also be performed independently of the NCL stored in the user terminal 3. In such a case, the user terminal 3 preferably gathers cell information of all measurable cells.

The measurement is performed by a scanning module 23. The scanning module 23 detects the cell information of one or more cells of wireless access nodes of the first and/or the second wireless access network.

The user terminal 3 is configured for storing the obtained cell information CI, or a derivative thereof, in a section of the storage means 22. While NCL-1A is normally erased from the storage means 22 after cell reselection or handover (in order to store the NCL of the new cell), the cell information remains stored for at least a particular period after the cell reselection or handover in order to transmit the cell information CI to the telecommunications system via the new cell using transmitter 24.

After cell reselection or handover to a cell of NodeB 2A, the transmitter 24 transmits the cell information CI, obtained while camping on the cell of eNB 1A, to a receiver 13 of NodeB 2A. Receiver 13 forwards the cell information to an updater 14 configured for updating (including verification) of the NCL-2A using the cell information CI.

When sufficient time is available, the mobile user terminal 3 may also transmit the cell information CI to the first wireless access network, particularly eNB 1A, in order to e.g. update NCL-1A, prior to cell reselection or handover to NodeB 2A. This transmission is shown by the dashed arrow from transmitter 23 towards eNB 1A.

In a particular example, a request is sent from request generator 12 to user terminal 3 to obtain cell information of the second wireless access network when user terminal is about to be handed over to this network. First, user terminal 3, using scanning means 23 detects as many PCI's (physical cell identifiers) as possible. As an example, the PCI's of the cells of nodes 2A-2D are detected. The PCI's are generally transmitted on a specialized channel (a pilot channel for UMTS). Using NCL-1A stored in storage 22 and determination module 21, the PCI's of NodeB 2A and NodeB 2B are omitted from the further processing, since these are already present in NCL-1A. The scanning means then detects the signal strengths of the pilot channel of the remaining cells identified by the PCI's of NodeB 2C and NodeB 2D. It may turn out that the signal strength for the cell of NodeB 2D is too low and, therefore, determination module 21 also omits further processing for cell NodeB 2D.

Subsequently, the scanning means tunes to the broadcast channel BCH of the cell of NodeB 2C and detects the GCID (global cell identifier) of this cell. If sufficient time is available before handover to the NodeB 2A occurs, the GCID and (possibly) other information is transmitted as cell information, using transmitter 24, to eNB 1A where it is received by receiver 13. Updater 14 may be used to update NCL-1A by adding wireless access node NodeB 2C, as illustrated. The other information may e.g. comprise location information of the mobile terminal 3, obtained using GPS module 25, when the scanning for available cells was performed.

However, time may be insufficient to complete the cell information gathering process and transmission of the cell information via the currently serving cell prior to handover. The GCID of NodeB 2C may then be stored as cell information CI in storage 22. User terminal 3 may then be handed over to NodeB 2A and transmission of the cell information CI may be performed using transmitter 24 to transmit the cell information CI to receiver 13 of NodeB 2A.

The cell information CI revealing the existence of NodeB 2C, i.e. the cell thereof, as an appropriate neighbour cell may be used for updating NCL-2A (for which the cell of NodeB 2C can be called a 'missing neighbour', since it was not present in NCL-2A) and for updating NCL-1A via a connection between the first wireless access network and the second wireless access network transporting cell information CI or a derivative thereof. This connection is indicated by the dashed arrow A in FIG. 2 and may e.g. be implemented using the OMC-2 and OMC-1 presented in FIG. 1.

Figures 3A, 3B:
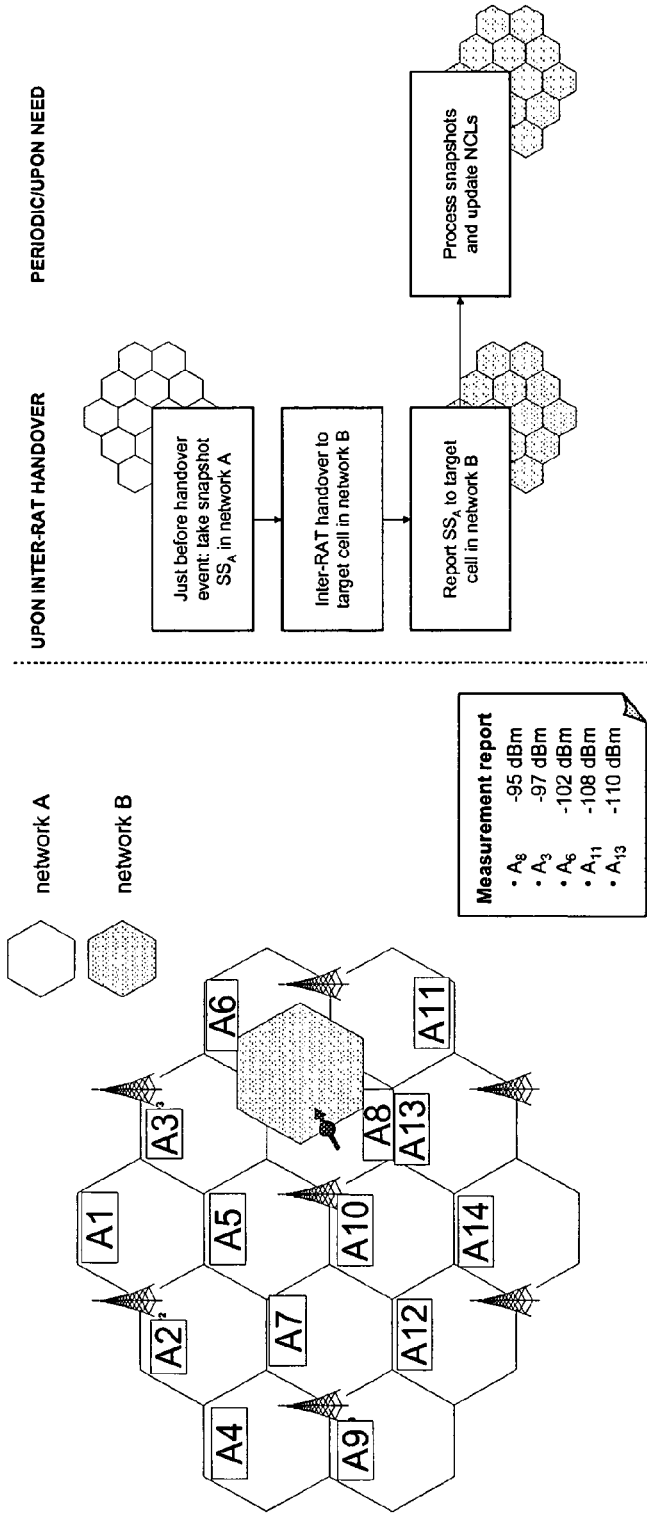
FIGS. 3A and 3B provide a schematic illustration of a telecommunications system and a flow chart for operating such a system, wherein cell information of wireless access nodes of the first wireless access network is obtained and reported via the second wireless access network.

Instead of or in addition to obtaining and reporting cell information of the second wireless access network, the mobile user terminal 3 may obtain cell information related to the first wireless access terminal. Reference is made to FIGS. 3A and 3B for an example of this.

In order to aid the automated optimisation of inter-network NCL, in one embodiment of the presented invention as illustrated in FIGS. 3A and 3B, an active terminal 3, just before making a handover from network A to network B, takes a snapshot of the pilot channel strengths it sees in network A, indicated by the measurement report. The terminal 3 performs a global scan and does not limit itself to considering only cells on the current NCL in order to identify potential cell candidates for adoption in the existing NCLs. Once the handover to network B is completed, user terminal 3 reports this snapshot to the new serving cell in network B. The new serving cell in network B can combine this report with other equivalent reports obtained from other handed-over terminals, in order to periodically optimise its inter-network NCL. The intra-network NCL of the originally serving cell may be updated as well by making the obtained cell information available to this cell using a connection between the wireless access networks.

Figures 4A, 4B:
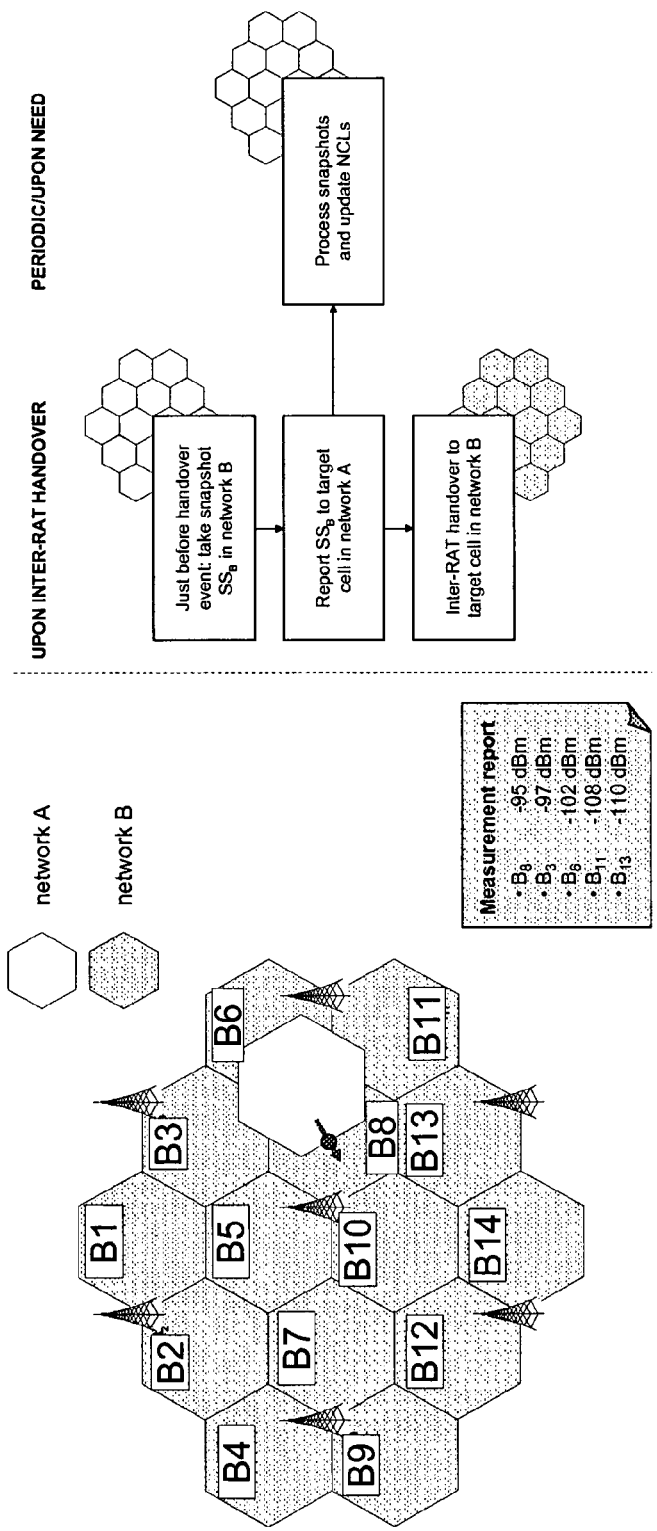
FIGS. 4A and 4B provide a schematic illustration of a telecommunications system and a flow chart for operating such a system, wherein cell information of wireless access nodes of the second wireless access network is obtained and reported via the first wireless access network.

FIGS. 4A and 4B provide another representation of an embodiment already discussed with reference to FIG. 2. The active terminal, just before making a handover from network A to network B, takes a snapshot of the pilot channel strengths it sees in network B, reports this to its source cell in network A (if sufficient time is available) and then undergoes the handover to the target cell in network B. Equivalently to the above description, now the source cell in network A can use these reports to self-optimise its inter-network NCL. The advantage of the second embodiment is that the cell in which the NCL is updated is in accordance with the direction of mobility. In other words, user motion from a source cell in network A to a target cell in network B makes use of the NCL in the source cell and hence the snapshot information generated at its handover can be used to update the NCL in the source cell. This advantage is primarily relevant in regions where inter-cell mobility is asymmetric. This is relevant when the operator favours one network over another for providing one or more particular services. This is also relevant in the case where mobility predominantly occurs in one direction (e.g. a one-way street).

Again, the cell information may also be stored using storage 22 and be transmitted to wireless access network A via wireless access network B. Also, the cell information of network B may be relevant for updating the intra-network NCL of the cell of this network.

The cell information CI (e.g. measurement reports) are periodically, or upon observed need, processed in each cell (access node) in order to re-optimise the inter-network NCL. This can be done by ranking all reported global cell IDs based on some weighted combination of the relative frequency at which they are reported and the associated pilot power strengths. This ranked list can then be combined with the actual handover statistics, as this indicates to what extent existing inter-network neighbour relations are actually used.

In an embodiment, a significant part of the processed reports of the mobile user terminals 3 (e.g. say more than 30% of the reported measurements) indicates a Cell ID with sufficient pilot (beacon) quality which is not included in the current inter-network NCL. Then this Cell ID should be added in the NCL.

Another example includes the case where an insignificant part of the processed UE reports (e.g. less than 1%) indicates a Cell ID with sufficient pilot (beacon) quality which is already included in the NCL. Then, this Cell ID should be removed from the NCL. Additionally, a listed neighbour to which hardly ever inter-network handover takes place, may be a candidate for removal from the NCL.

Additions or removals of cells in Network A and Network B may automatically be reflected in the ranking of the Cell IDs with sufficient pilot (beacon) strengths that are reported by the UEs. Consequently, these cells are then automatically added or removed from the NCL and no manual configuration is necessary.

As an alternative to optimising NCLs for each network separately, in an embodiment a single integrated NCL in each cell, containing cells both in the same network and in other (cooperative) networks, and both on the same carrier and different carriers is automatically optimised. It is noted that optimisation of such an integrated list may then also implicitly involve a ranking of networks and carriers for potential adoption in the NCL (and possibly even for potential handovers).

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention claimed is:

1. A system for updating a neighbour cell list in a telecommunications architecture comprising a first wireless access network having a first wireless access node for which at least one first neighbour cell list is defined and a second wireless access network having a second wireless access node for which at least one second neighbour cell list is defined, the system comprising:
   a detector configured for detecting user terminals to be transferred from the first wireless access node of the first wireless access network to the second wireless access node of the second wireless access network;
   a selector configured for selecting a part of the user terminals;
   a request generator configured for requesting from the first wireless access node one or more of the selected user terminals to report cell information of a plurality of wireless access nodes of at least one of the first wireless access network and the second wireless access network;
   a receiver configured for receiving the cell information from the one or more of the selected user terminals; and
   updating means configured for updating at least one of the first neighbour cell list and the second neighbour cell list using the received cell information.

2. The system according to claim 1,
   wherein the request generator is configured for requesting from the first wireless access node one or more of the selected user terminals to report cell information of a plurality of wireless access nodes of the first wireless access network;
   wherein the receiver is configured for receiving the cell information of the wireless nodes of the first wireless access network via the second wireless access node,
   the system further comprising a transfer system configured for transferring user terminals from the first wireless access network to the second wireless access network prior to receiving the cell information of the plurality of wireless access nodes of the first wireless access network via the second wireless access node.

3. The system according to claim 2, further comprising a data transfer system for transferring the cell information, or a derivative thereof, of the wireless access nodes of the first wireless access network to the first wireless access node.

4. The system according to claim 1,
   wherein the request generator is configured for requesting from the first wireless access node one or more of the selected user terminals to report cell information of a plurality of wireless access nodes of the second wireless access network;
   wherein the receiver is configured for receiving the cell information of the wireless nodes of the second wireless access network via the second wireless access node,
   the system further comprising a transfer system configured for transferring user terminals from the first wireless access network to the second wireless access network prior to receiving the cell information of the plurality of wireless access nodes of the second wireless access network via the second wireless access node.

5. The system according to claim 4, further comprising a data transfer system for transferring the cell information, or a derivative thereof, of the wireless access nodes of the second wireless access network to the first wireless access node.

6. The system according to claim 1,
   wherein the request generator is configured for requesting from the first wireless access node one or more of the selected user terminals to report cell information of a plurality of wireless access nodes of the second wireless access network;
   wherein the receiver is configured for receiving the cell information of the wireless access nodes of the second wireless access network via the first wireless access node,
   further comprising a transfer system configured for transferring user terminals from the first wireless access network to the second wireless access network after receiving the one or more cell parameters of wireless access nodes of the second wireless access network via the first wireless access node.

7. The system according to claim 1, wherein the telecommunications system is further configured for receiving location information from one or more of the detected user terminals and wherein the location information is used as a selection parameter for selecting the part of the detected user terminals.

8. The system according to claim 1, wherein one or more thresholds, possibly service-dependent, are defined in the telecommunications system for transferring the user terminals between the first wireless access network and the second wireless access network and wherein at least one of the thresholds is used as a selection parameter for selecting the part of the detected user terminals.

9. In a telecommunications architecture comprising a first wireless access network having a first wireless access node for which at least one first neighbour cell list is defined and a second wireless access network having a second wireless access node for which at least one second neighbour cell list is defined, a method for updating at least one of the first and second neighbour cell lists comprising the steps of:
  detecting user terminals to be transferred from the first wireless access node of the first wireless access network to the second wireless access node of the second wireless access network;
  selecting a part of the user terminals; requesting from the first wireless access node one or more of the selected user terminals to report cell information of a plurality of wireless access nodes of at least one of the first wireless access network and the second wireless access network;
  receiving the cell information from the one or more of the selected user terminals; and
  updating at least one of the first neighbour cell list and the second neighbour cell list using the received cell information.

10. The method according to claim 9, comprising the steps of:
  requesting from the first wireless access node one or more of the selected user terminals to report cell information of a plurality of wireless access nodes of the first wireless access network;
  receiving the cell information of the wireless nodes of the first wireless access network via the second wireless access node, and
  transferring the selected user terminals from the first wireless access network to the second wireless access network prior to receiving the cell information of the plurality of wireless access nodes of the first wireless access network via the second wireless access node.

11. The method according to claim 9, comprising the steps of:
  requesting from the first wireless access node one or more of the selected user terminals to report cell information of a plurality of wireless access nodes of the second wireless access network;
  receiving the cell information of the wireless nodes of the second wireless access network via the second wireless access node, and
  transferring user terminals from the first wireless access network to the second wireless access network prior to receiving the cell information of the plurality of wireless access nodes of the second wireless access network via the second wireless access node.

12. The method according to claim 9, comprising the steps of:
  requesting from the first wireless access node one or more of the selected user terminals to report cell information of a plurality of wireless access nodes of the second wireless access network;
  receiving the cell information of the wireless access nodes of the second wireless access network via the first wireless access node; and
  transferring user terminals from the first wireless access network to the second wireless access network after receiving the one or more cell parameters of wireless access nodes of the second wireless access network via the first wireless access node.

13. A non-transitory computer-readable storage medium containing a set of instructions that, when executed by a processor in a telecommunications architecture comprising a first wireless access network having a first wireless access node for which at least one first neighbour cell list is defined and a second wireless access network having a second wireless access node for which at least one second neighbour cell list is defined, performs a method for updating at least one of the first and second neighbour cell lists, including the steps of:
  detecting user terminals to be transferred from the first wireless access node of the first wireless access network to the second wireless access node of the second wireless access network;
  selecting a part of the user terminals;
  requesting from the first wireless access node one or more of the selected user terminals to report cell information of a plurality of wireless access nodes of at least one of the first wireless access network and the second wireless access network;
  receiving the cell information from the one or more of the selected user terminals; and
  updating at least one of the first neighbour cell list and the second neighbour cell list using the received cell information.

14. The method according to claim 10, further comprising the step of transferring the cell information, or a derivative thereof, of the wireless access nodes of the first wireless access network to the first wireless access node.

15. The method according to claim 10, comprising the steps of:
  requesting from the first wireless access node one or more of the selected user terminals to report cell information of a plurality of wireless access nodes of the second wireless access network;
  receiving the cell information of the wireless nodes of the second wireless access network via the second wireless access node, and
  transferring user terminals from the first wireless access network to the second wireless access network prior to receiving the cell information of the plurality of wireless access nodes of the second wireless access network via the second wireless access node.

16. The method according to claim 11, comprising the step of transferring the cell information, or a derivative thereof, of the wireless access nodes of the second wireless access network to the first wireless access node.

17. The method according to claim 15, comprising the step of transferring the cell information, or a derivative thereof, of the wireless access nodes of the second wireless access network to the first wireless access node.

* * * * *